(12) United States Patent
Guy (10) Patent No.: US 8,511,948 B2
(45) Date of Patent: Aug. 20, 2013

(54) TOOL CLAMPING MECHANISM

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 321 days.

(21) Appl. No.: 13/017,535

(22) Filed: Jan. 31, 2011

(65) Prior Publication Data

US 2011/0194907 A1    Aug. 11, 2011

(30) Foreign Application Priority Data

Feb. 8, 2010  (IL) .......................................... 203798

(51) Int. Cl.
*B23B 31/113*    (2006.01)
(52) U.S. Cl.
CPC .................................. *B23B 31/113* (2013.01)
USPC .......................... 408/239 R; 408/226; 279/93
(58) Field of Classification Search
USPC ................ 279/93; 408/231, 238, 239 R, 226
See application file for complete search history.

(56) References Cited

U.S. PATENT DOCUMENTS

| 1,824,509 | A |   | 9/1931 | Snader |        |
|-----------|---|---|--------|--------|--------|
| 1,975,877 | A | * | 10/1934 | Thomas | 279/93 |
| 2,092,060 | A | * | 9/1937 | Gairing | 279/93 |
| 2,103,379 | A | * | 12/1937 | Oxford | 29/558 |
| 2,158,120 | A | * | 5/1939 | Hirschberg | 175/417 |
| 3,304,816 | A | * | 2/1967 | Galorneau | 408/226 |
| 4,597,699 | A | * | 7/1986 | Ramunas | 409/232 |
| 6,276,879 | B1 | * | 8/2001 | Hecht | 409/234 |
| 6,394,465 | B1 |   | 5/2002 | Guy |        |

FOREIGN PATENT DOCUMENTS

| DE | 3205088 A1 | 8/1983 |
|----|------------|--------|
| DE | 20102516 U1 | 8/2001 |
| JP | 59 059303 A | 4/1984 |

OTHER PUBLICATIONS

International Search Report dated Jun. 1, 2011 issued in corresponding International Application No. PCT/IL2011/000040.

* cited by examiner

*Primary Examiner* — Daniel Howell
*Assistant Examiner* — Alan Snyder
(74) *Attorney, Agent, or Firm* — Womble Carlyle (57) ABSTRACT

A tool clamping mechanism connects a first member to a second member. The first member has a cylindrical stem with a coupling tooth projecting from the stem. The second member has a clamping cavity formed by the union of a gripping bore and an access hole. The access hole has an access bore and a tooth access hole formed to accommodate the stem and the coupling tooth respectively. The stem diameter of the stem is larger than the gripping bore diameter of the gripping bore. The clamping cavity further has a coupling recess for accommodating the coupling tooth. The coupling recess has a drive surface for engaging a driven surface located on the coupling tooth to create a force which pushes the stem from the access bore into the gripping bore and helps prevent separation of the two members.

22 Claims, 6 Drawing Sheets

TOOL CLAMPING MECHANISM

FIELD OF THE INVENTION

The present invention relates to tool clamping mechanisms for clamping one member to another.

BACKGROUND OF THE INVENTION

U.S. Pat. No. 6,394,465 discloses a tool clamping device including a clamping member having an insertion bore formed by the union of an access bore portion and a gripping bore portion. An insertion member having a cylindrical shank portion with a diameter smaller than the access bore portion diameter, is insertable into the access bore. The diameter of the shank portion is slightly larger than the diameter of the gripping bore portion. When the clamping mechanism is transferred to a clamped position, the insertion member is forcibly fitted into the gripping bore portion by an external force exerted on the shank portion by a bearing sleeve or a clamping screw. A firm clamping between the shank portion and the gripping bore portion is maintained by the external force. The external force guarantees that the shank portion remains pressed against the gripping bore portion during operation of the cutting tool. Without the external additional force, the clamping mechanism of '465 cannot perform as such, since any external force applied on the gripped shank portion, in a direction transverse to a longitudinal direction of the shank portion, may pull the shank portion out of the gripping bore portion.

In the clamping method where the clamping screw is used to force the shank portion into the gripping bore portion, the wall into which the clamping screw is threaded, must have a minimum thickness, in order for the thread to work properly.

SUMMARY OF THE INVENTION

In accordance with the present invention there is provided a clamping mechanism between a first member and a second member. The first member comprising a front portion at a front end of the first member and a male portion extending rearwardly from the front portion. The male portion comprising a cylindrical stem having a stem diameter D3. The stem comprising a stem peripheral surface. The second member comprising:

a female portion at a front end of the second member, the female portion comprising a front face, and a clamping cavity opening out to the front face and formed by the union of an access hole and a gripping bore. The clamping cavity comprising an internal coupling recess comprising a drive surface; and a rear portion extending rearwardly from the female portion.

The gripping bore having a circular cross section with a gripping bore diameter D2 in an end view of the female portion, the gripping bore comprising a gripping surface having an arc angle greater than 180 degrees. The access hole comprising a tooth access hole and an access bore having a circular cross section with an access bore diameter D1 in the end view of the second member, wherein D1>D3>D2. The tooth access hole being formed in the front face and extending rearwardly. The access bore and the gripping bore have respective longitudinal axes spaced apart at least along a portion thereof.

Wherein the male portion further comprises a coupling tooth projecting from the stem peripheral surface for being received in the tooth access hole and in the coupling recess, and the coupling tooth comprising a driven surface for engagement with the drive surface.

According to embodiments of the present invention, the driven surface of the coupling tooth rises away from the stem peripheral surface in a direction towards a stem rear surface.

According to embodiments of the present invention, the driven surface of the coupling tooth rises in a clockwise direction in an end view of the stem.

According to embodiments of the present invention, the access bore intersects with the gripping bore at two intersection lines.

According to embodiments of the present invention, the gripping surface extends longitudinally the same length as the gripping bore.

According to embodiments of the present invention, $\alpha$ equals 181 degrees.

According to embodiments of the present invention, in an unclamped position, the coupling tooth is located in the tooth access hole.

According to embodiments of the present invention, in a clamped position, the driven surface of the coupling tooth is in engagement with the drive surface of the coupling recess.

According to embodiments of the present invention, in a clamped position, the gripping surface of the gripping bore is in engagement with the stem peripheral surface along an area with an arc angle of at least 180 degrees.

According to embodiments of the present invention, in a clamped position, a rear face of the front portion is in engagement with the front face of the female portion.

According to embodiments of the present invention, the longitudinal axes of the access bore and the gripping bore are parallel.

According to embodiments of the present invention, the longitudinal axes of the access bore and the gripping bore are spaced apart a distance L.

According to embodiments of the present invention, the gripping bore tapers towards the front face.

According to embodiments of the present invention, the drive surface of the coupling recess has a frusto-conical shape.

According to embodiments of the present invention, the gripping bore has a cylindrical shape.

According to embodiments of the present invention, the access bore has a cylindrical shape.

In accordance with the present invention, there is provided a method for assembling the clamping mechanism, comprising the steps of:

a) inserting the stem into the access hole until the coupling tooth is aligned with the coupling recess in an axial direction; and b) turning the first member clockwise with respect to the second member, in an end view of the front portion, until the stem is fully transferred from the access hole to the gripping bore and the stem peripheral surface is in full abutment with the gripping surface with the driven surface of the coupling tooth in full engagement with the drive surface of the coupling recess.

The first member may be a cutting head. The second member may be a tool shank. Together, cutting head and the tool shank may form a cutting tool.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIGS. 1 to 5, showing a tool clamping mechanism 10 between a first member 12 and a second member 14 in accordance with embodiments of the present invention. The first member 12 may, for example, be a cutting head 12 having a direction of rotation and provided with one or more cutting inserts, blades, etc. (not shown) at a front end 27 thereof. Meanwhile, the second member 16 may, for example, be a tool shank 16 having a direction of rotation and configured to rotationally drive the cutting head 12 in said rotational direction, the cutting head 12 and the shank 14 together constituting a cutting tool.

Figure 1:
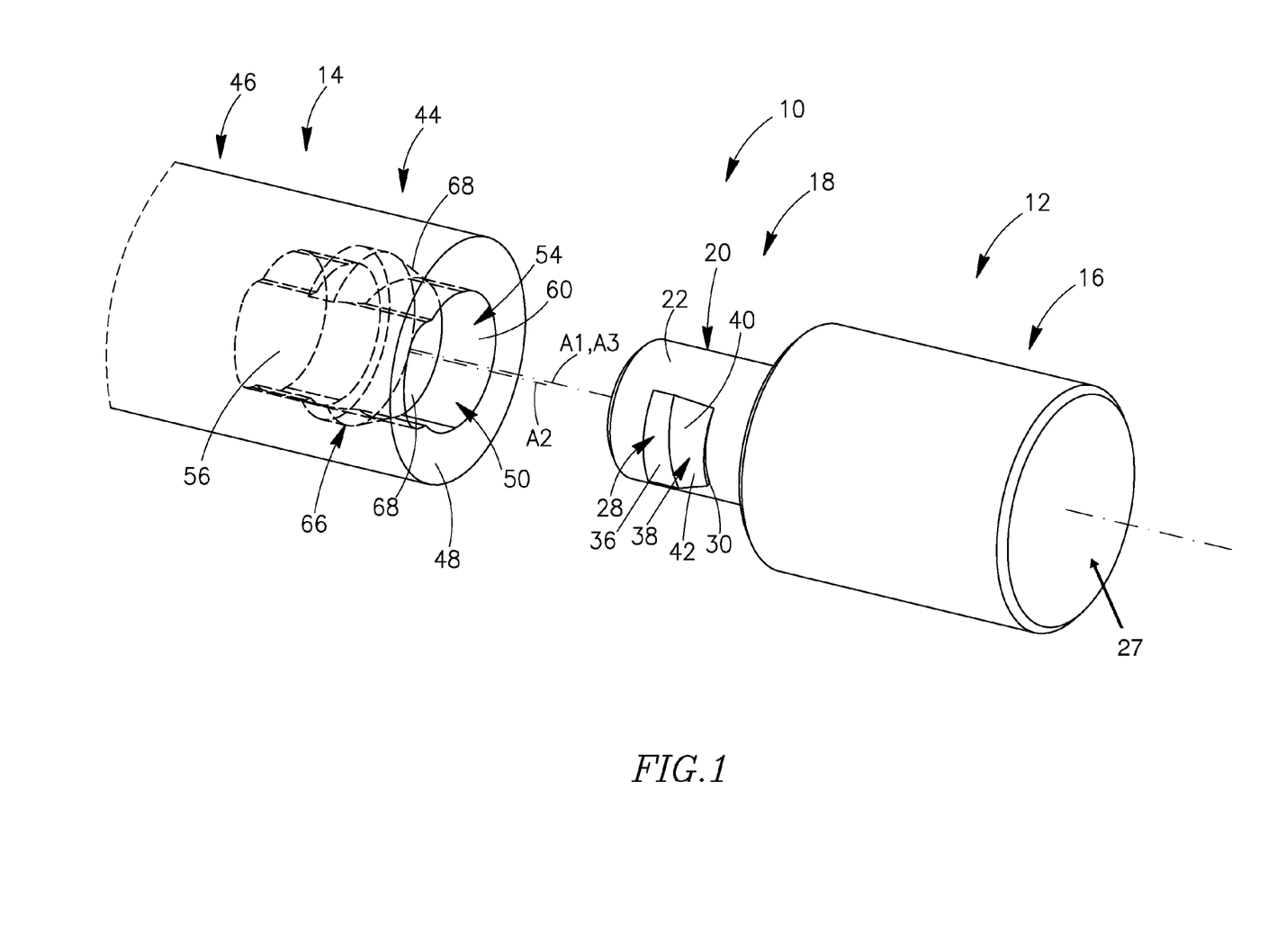
FIG. 1 is an isometric exploded view of a clamping mechanism with first and second members according to embodiments of the present invention.
Figure 2:
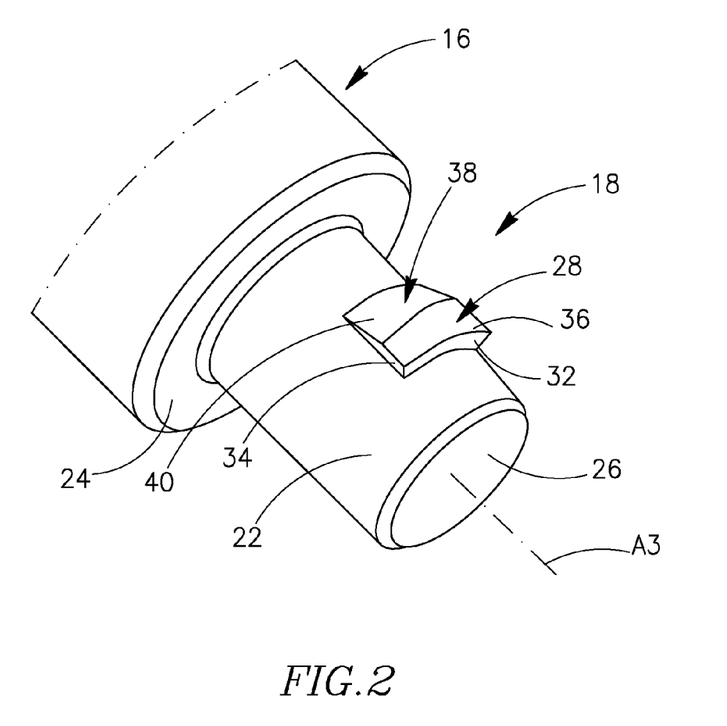
FIG. 2 is an isometric view of the first member.
Figure 3:
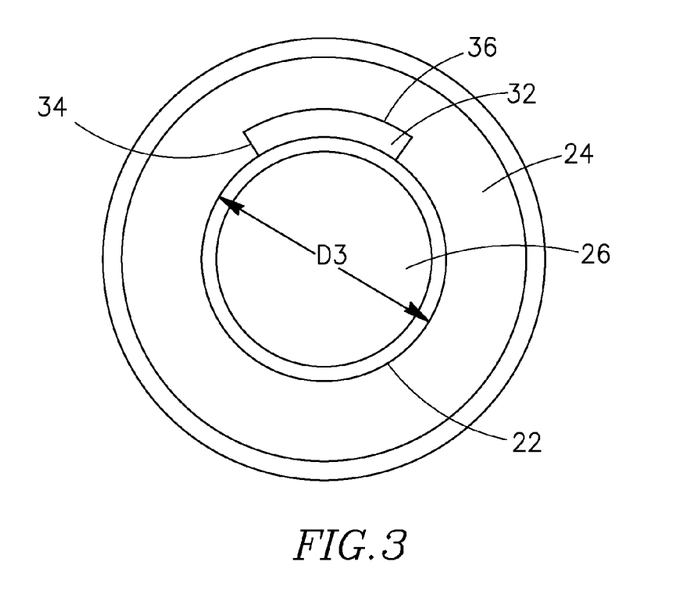
FIG. 3 is an end view of the first member.

The first member 12 has a front portion 16 located at a front end and a male portion 18 which extends rearwardly from the front portion 16. The male portion 18 includes a cylindrical stem 20 with a stem diameter D3 and a longitudinal stem axis A3. The stem 20 has a stem peripheral surface 22 which extends between a rear face 24 of the front portion 16 and a stem rear surface 26. According to some embodiments, the rear face 24 and the stem rear surface 26 face rearwards. According to some embodiments, the rear face 24 and the stem rear surface 26 are oriented perpendicularly to the stem axis A3.

The male portion 18 further includes a coupling tooth 28 projecting from the stem peripheral surface 22. The coupling tooth 28 includes opposite tooth front and rear surfaces (30, 32), opposite tooth side surfaces 34, a tooth peripheral surface 36 and a driven surface 38. According to some embodiments, the driven surface 38 extends between the tooth front surface 30, the tooth peripheral surface 36 and the tooth side surfaces 34. According to some embodiments, the driven surface 38 rises away from the stem peripheral surface 22, in a direction towards the stem rear surface 26 (see FIG. 2). According to some embodiments, the driven surface 38 rises in a clockwise direction in an end view of the stem 20 (see FIG. 1) defining lower and higher tooth portions (40, 42). Thus, in some embodiments, the driven surface 38 ramps radially outwardly in a rearward axial direction along the stem axis A3 and ramps radially outwardly in a circumferential direction of rotation of the first member 12.

Figure 4:
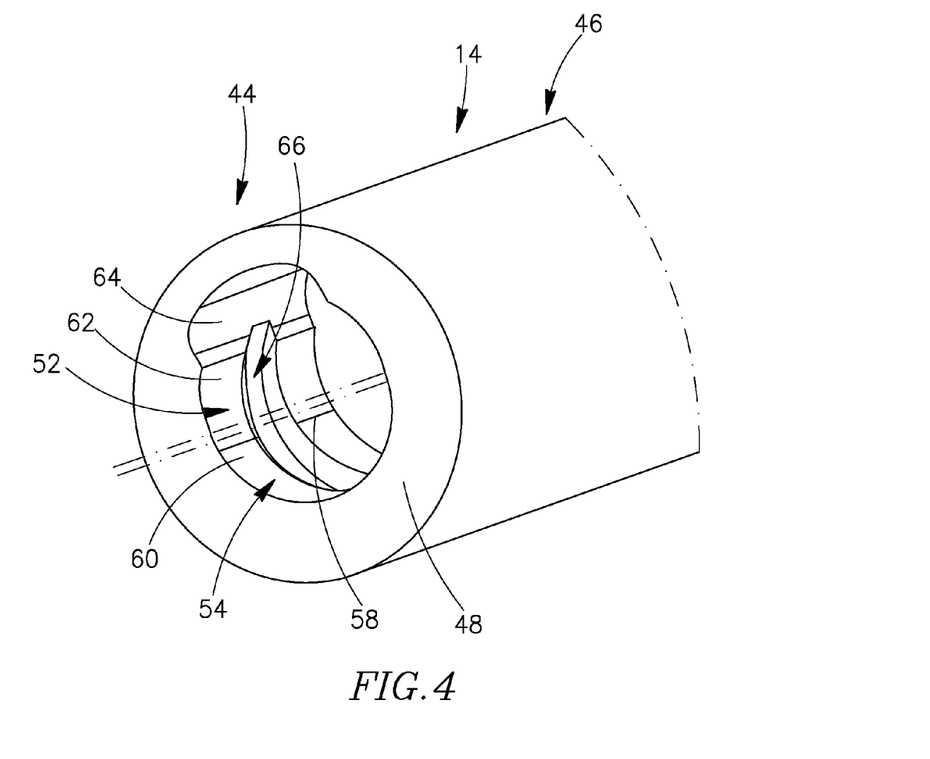
FIG. 4 is a generally isometric view of the second member.
Figure 5:
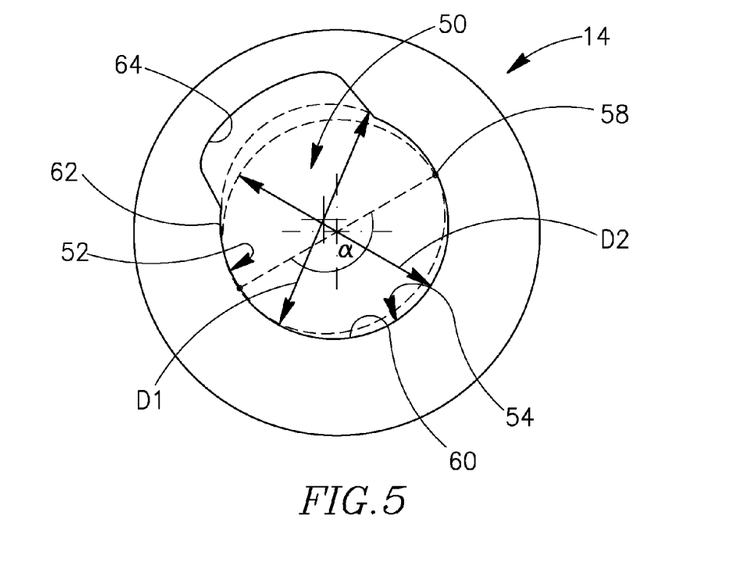
FIG. 5 is an end view of the second member.

Attention is drawn to FIGS. 4 and 5, showing the second member 14. The second member 14 includes a female portion 44 at a front end and a rear portion 46 extending rearwardly from the female portion 44. The female portion 44 includes a forwardly facing front face 48 at a front end and a longitudinal clamping cavity 50 extending rearwardly and opening out to the front face 48. The clamping cavity 50 is formed by the union of an access hole 52 and a gripping bore 54 and includes a clamping cavity rear surface 56. The gripping bore 54 has a longitudinal gripping bore axis A2 and a circular cross section with a gripping bore diameter D2, taken perpendicularly to the gripping bore axis A2. The access hole 52 intersects with the gripping bore 54 at two intersection lines 58, defining a gripping surface 60 having an arc angle $\alpha$ greater than 180 degrees throughout its length. The angle $\alpha$ is preferably chosen to be 181 degrees.

According to some embodiments, the gripping surface 60 is semi-cylindrical. According to some embodiments, the gripping surface 60 extends longitudinally the same length as the gripping bore 54. The access hole 52 includes an access bore 62 with an access bore axis A1, the access bore 62 has a circular cross section with an access bore diameter D1, taken perpendicularly to the access bore axis A1. At any cross section taken perpendicularly to any of the axes A1, A2 and A3, the access bore diameter D1 of the access bore 62 is greater than the stem diameter D3 of the stem 20, which is greater than the gripping bore diameter D2 of the gripping bore 54 (D1>D3>D2).

The access hole 52 further includes a tooth access hole 64 formed in the front face 48 for receiving the coupling tooth 28 of the first member 12. According to some embodiments, the tooth access hole 64 extends between the front face 48 and the clamping cavity rear surface 56. The access bore axis A1 and the gripping bore axis A2 are parallel and spaced apart a distance L (see FIG. 7).

The clamping cavity 50 further includes a circumferentially extending internal coupling recess 66 located axially between the clamping cavity rear surface 56 and the front face 48. The coupling recess 66 has a circular cross section in an end view of the female portion 44. The coupling recess 66 is coaxial with the gripping bore axis A2 and includes a drive surface 68 formed to engage the driven surface 38 of the coupling tooth 28. According to some embodiments, the drive surface 68 has a right frusto-conical shape, designed to receive the shape of and abut the driven surface 38 of the coupling tooth 28. When the clamping mechanism 10 is assembled, the drive surface 68 is designed with such dimensions as to allow access to the lower tooth portion 40 of the driven surface 38, and prevent access to the higher tooth portion 42 of the driven surface 38.

Figure 6:
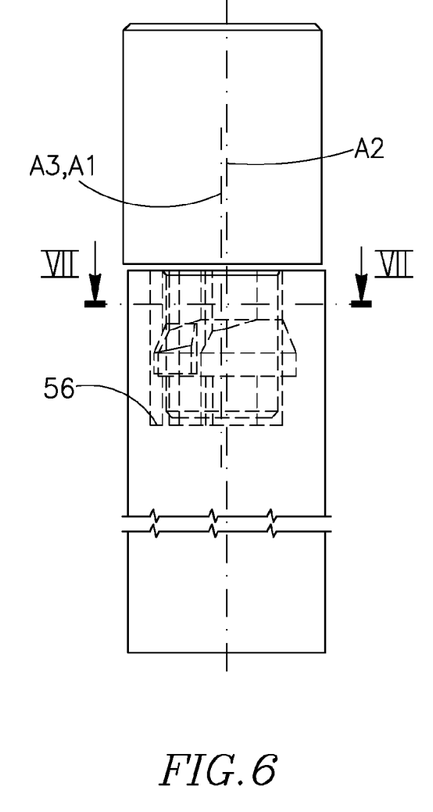
FIG. 6 is a side view of the assembled clamping mechanism in an unclamped position.
Figure 7:
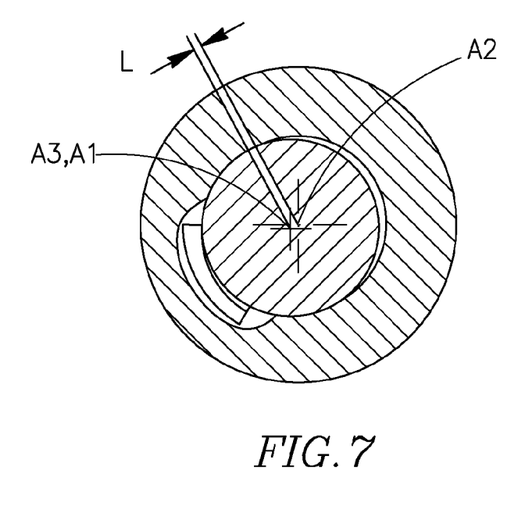
FIG. 7 is a cross-section taken along the line VII-VII of FIG. 6.

Reference is made to FIGS. 6 and 7, showing the clamping mechanism 10, and the first member 12, in an unclamped position. In this position, the male portion 18 is located in the clamping cavity 50, the stem 20 is located in the access bore 62 and the coupling tooth 28 is located in the tooth access hole 64. The longitudinal axis A3 of the stem 20 is generally co-aligned with the longitudinal axis A1 of the access bore 62, the first member 12 is slidingly free to move in the access hole 52 in the axial direction, with respect to the second member 14 and the gripping surface 60 of the gripping bore 54 does not abut the stem peripheral surface 22. The male portion 18 of the first member 12 is inserted into the clamping cavity 50 until the coupling tooth 28 is aligned with the coupling recess 66 in an axial direction.

Figure 8:
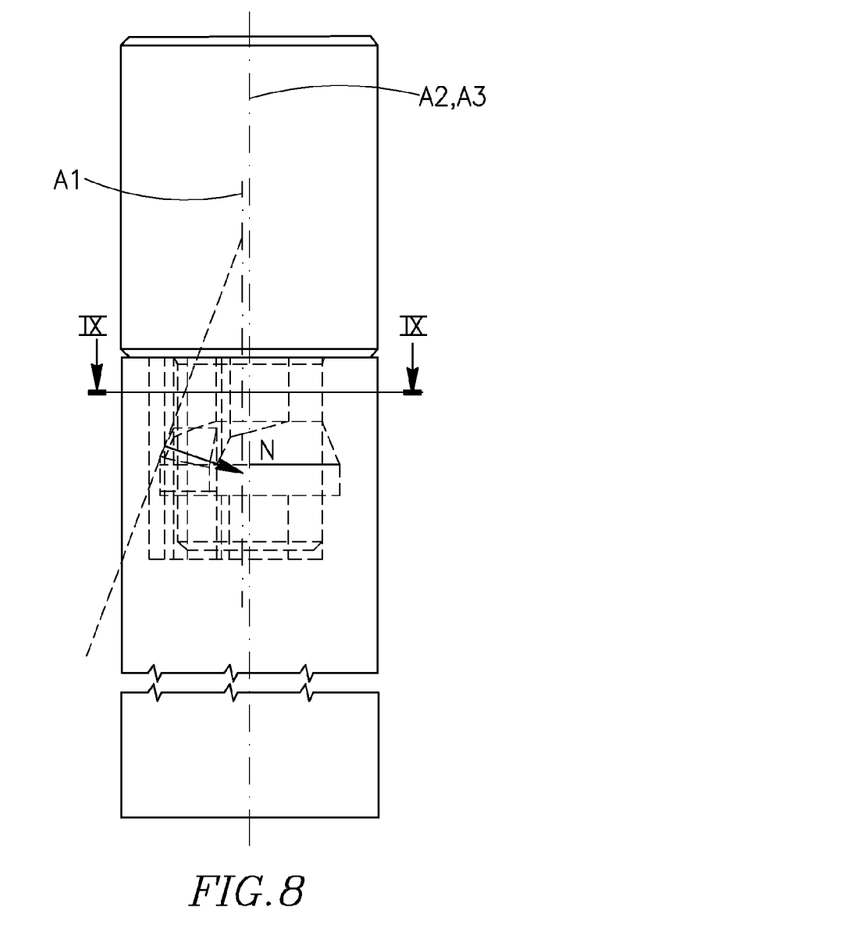
FIG. 8 is a side view of the assembled clamping mechanism in a clamped position.
Figure 9:
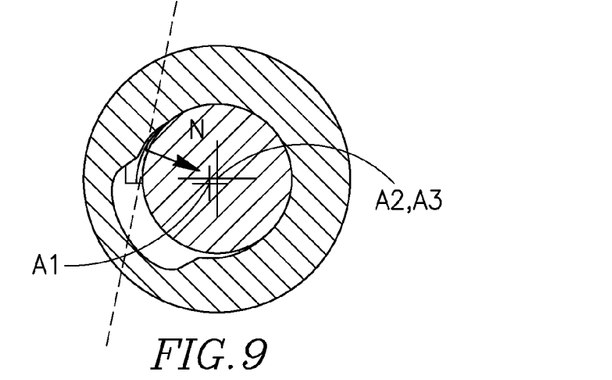
FIG. 9 is a cross-section taken along the line IX-IX of FIG. 8.

Reference is made to FIGS. 8 and 9, showing the clamping mechanism 10, and the first member 12, in a clamped position. The stem 20 is located in the gripping bore 54 and the gripping surface 60 of the gripping bore 54 abuts the stem peripheral surface 22. The longitudinal axis A3 of the stem 20 coincides with the gripping bore axis A2 (see FIG. 9). In this position, the coupling tooth 28 is located in the coupling recess 66 and the drive surface 68 of the coupling recess 66 abuts the driven surface 38 of the coupling tooth 28 such that the drive surface 68 is in driving engagement with the driven surface 38. Furthermore, according to some embodiments, the front rear face 24 may abut the front face 48.

Transferring the clamping mechanism 10, or the first member 12, from the unclamped position to the clamped position is done by turning the first member 12 with respect to the second member 14 clockwise, in an end view of the front portion 16 of the first member 12. Turning is only possible in a clockwise direction since, as mentioned hereinabove, the higher tooth portion 42 of the driven surface 38 cannot pass though the coupling recess 66. As the turning progresses, the coupling tooth 28 is transferred from the tooth access hole 64 to the coupling recess 66, until at a certain point, the driven surface 38 starts to abut the drive surface 68. Since the stem diameter D3 of the stem 20 is greater than the gripping bore diameter D2 of the gripping bore 54 (D3>D2), the stem 20 has to be forcibly pressed into the gripping bore 54. As disclosed hereinabove, the driven surface 38 rises in a clockwise direction in an end view of the stem 20. Therefore, when the driven surface 38 starts to abut the coupling recess 66, a normal force N is generated in a general direction towards the gripping surface 60 (See FIG. 9). The force N, which builds up as the first member 12 is further turned, pushes the stem 20 through the two intersection lines 58 and into the gripping bore 54, while the gripping bore 54 is slightly expanded. It should be explained that according to some embodiments, the gripping bore 54 is designed with such tolerances as to allow such an expansion of the gripping bore 54.

Figure 10:
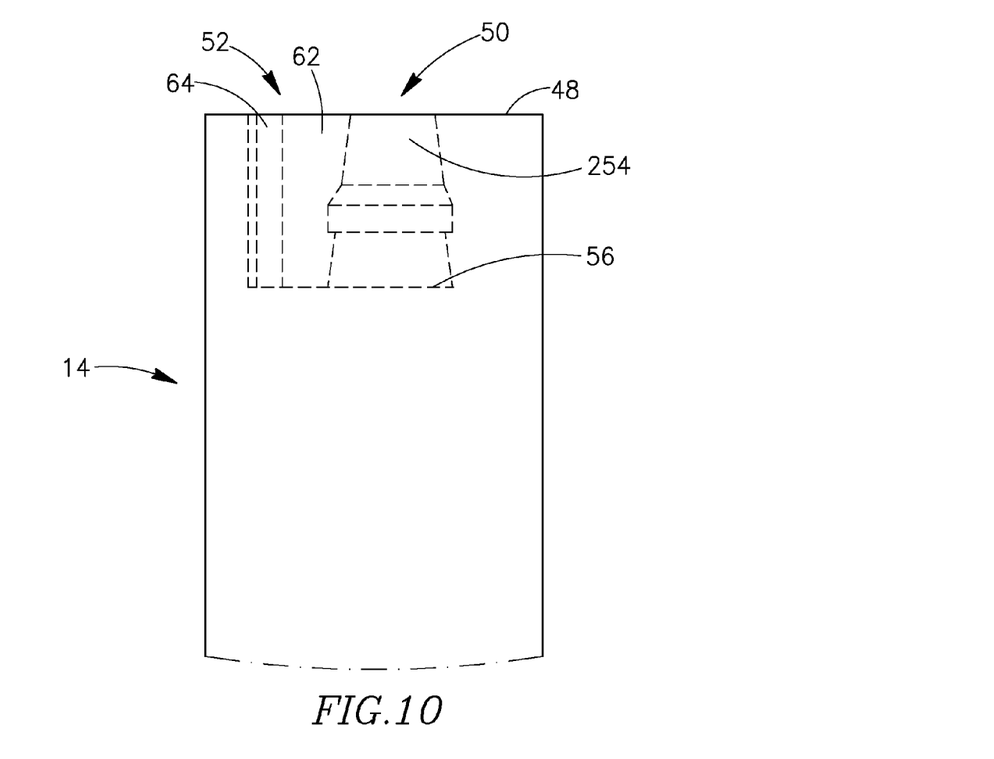
FIG. 10 is a side view of an embodiment of the second member.

According to some embodiments, the clamping cavity 50 is formed by the union of an access hole 52 and a gripping bore 254 that tapers towards the front face 48 facilitating the expansion of the gripping bore 254 (See FIG. 10) near the clamping cavity rear surface 56.

Figure 11:
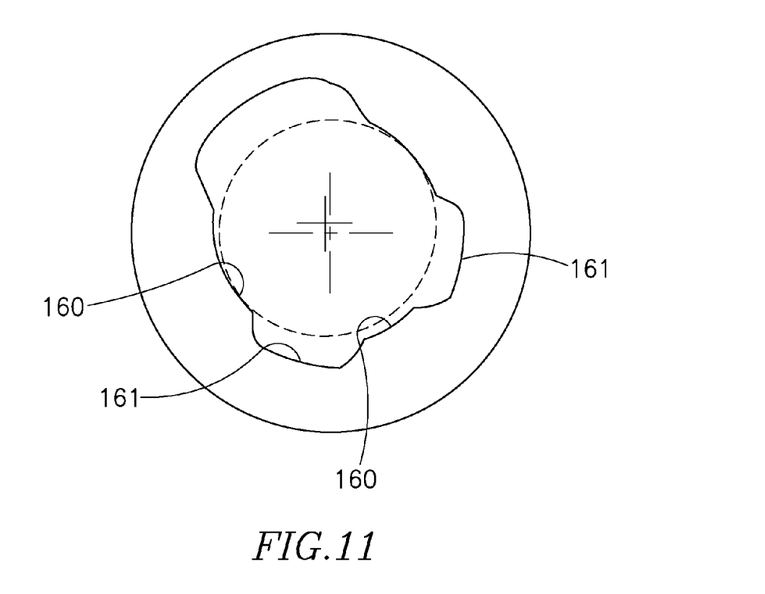
FIG. 11 is an end view of an embodiment of the second member.

According to some embodiments, in a cross section taken in an end view of the female portion, the gripping surface 60 is continuous (see FIGS. 1, 5-9) and according to some embodiments, the gripping surface 160 is non-continuous and includes longitudinal depressions 161 (see FIG. 11).

Furthermore, in those embodiments in which the drive surface 68 has a right frusto-conical shape, the force N also has a component directed rearwardly, in a direction away from the front face 48. This enables the firm abutment between the front face 48 and the rear face 24, ensuring axial locking between the first member 12 and the second member 14. According to some embodiments, passage into and out of the gripping bore 54 may be evidenced by an audible click as the stem 20 passes past the intersection lines 58 between the access and gripping bores (62, 54).

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A clamping mechanism (10) between a first member (12) and a second member (14);
    the first member (12) comprising:
        a front portion (16) at a front end of the first member (12); and
        a male portion (18) extending rearwardly from the front portion (16), the male portion (18) comprising a cylindrical stem (20) having a stem diameter D3; the stem (20) comprising a stem peripheral surface (22) and a stem rear surface (26);
    the second member (14) comprising:
        a female portion (44) at a front end of the second member (14), the female portion (44) comprising a front face (48) and a clamping cavity (50) opening out to the front face (48) and formed by the union of an access hole (52) and a gripping bore (54);
        the clamping cavity (50) comprising a clamping cavity rear surface (56) and an internal coupling recess (66) axially spaced apart from the clamping cavity rear surface (56) in a direction of the front face (48), the internal coupling recess (66) comprising a drive surface (68); and
        a rear portion (46) extending rearwardly from the female portion (44); the gripping bore (54) having a circular cross section with a gripping bore diameter D2 in an end view of the female portion (44), the gripping bore (54) comprising a gripping surface (60) having an arc angle (α) greater than 180 degrees;
        the access hole (52) comprising a tooth access hole (64) and an access bore (62) having a circular cross section with an access bore diameter D1 in the end view of the second member (14), wherein D1>D3>D2; the tooth access hole (64) being formed in the front face (48) and extending rearwardly;
        the access bore (62) and the gripping bore (54) have respective longitudinal axes spaced apart at least along a portion thereof;
    wherein:
        the male portion (18) further comprises a coupling tooth (28) projecting from the stem peripheral surface (22) and configured to be received in the tooth access hole (64) and in the coupling recess (66), the coupling tooth (28) comprising a driven surface (38) suitable for engagement with the drive surface (68); and
        the first member is movable between a clamped position and an unclamped position, wherein in the unclamped position the male portion (18) is located in the access hole (52) and in the clamped position, the gripping surface (60) of the gripping bore (54) is in engagement with the stem peripheral surface (22).

2. The clamping mechanism (10) according to claim 1, wherein the driven surface (38) of the coupling tooth (28) rises away from the stem peripheral surface (22) in a direction towards a stem rear surface (26).

3. The clamping mechanism (10) according to claim 1, wherein the driven surface (38) of the coupling tooth (28) rises in a clockwise direction in an end view of the stem (20).

4. The clamping mechanism (10) according to claim 1, wherein the access bore (62) has a cylindrical shape.

5. The clamping mechanism (10) according to claim 1, wherein the access bore (62) intersects with the gripping bore (54) at two intersection lines (58).

6. The clamping mechanism (10) according to claim 1, wherein the gripping bore (254) tapers towards the front face (48).

7. The clamping mechanism (10) according to claim 1, wherein the gripping bore (54) has a cylindrical shape.

8. The clamping mechanism (10) according to claim 1, wherein the gripping surface (60) extends longitudinally the same length as the gripping bore (54).

9. The clamping mechanism (10) according to claim 1, wherein the gripping surface (160) comprises longitudinal depressions (161).

10. The clamping mechanism (10) according to claim 1, wherein the arc angle (α) equals 181 degrees.

11. The clamping mechanism (10) according to claim 1, wherein in the clamped position, a rear face (24) of the front portion (16) is in engagement with the front face (48) of the female portion (44).

12. The clamping mechanism (10) according to claim 1, wherein the longitudinal axes of the access bore (62) and the gripping bore (54) are parallel.

13. The clamping mechanism (10) according to claim 1, wherein the longitudinal axes of the access bore (62) and the gripping bore (54) are spaced apart by a distance (L).

14. The clamping mechanism (10) according to claim 1, wherein the drive surface (68) of the coupling recess (66) has a frusto-conical shape.

15. A method for assembling the clamping mechanism (10) of claim 1 comprising the steps of:
   a) inserting the stem (20) into the access hole (52) until the coupling tooth (28) is aligned with the coupling recess (66) in an axial direction; and
   b) turning the first member (12) clockwise with respect to the second member (14), in an end view of the front portion (16), until the stem (20) is fully transferred from the access hole (52) to the gripping bore (54) and the stem peripheral surface (22) is in full abutment with the gripping surface (60) with the driven surface (38) of the coupling tooth (28) in engagement with the drive surface (68) of the coupling recess (66).

16. A cutting head (12) having a direction of rotation and comprising:
   a front portion (16) at a front end of the cutting head (12), the front portion having a rearwardly facing rear face (24); and
   a male portion (18) extending rearwardly from the front portion (16), the male portion (18) comprising:
      a cylindrical stem (20) having a longitudinal stem axis (A3), a stem diameter D3, and a stem peripheral surface (22); and
      a circumferentially extending coupling tooth (28) projecting from the stem peripheral surface (22), the coupling tooth (28) comprising opposite tooth front and rear surfaces (30, 32), opposite tooth side surfaces (34), a tooth peripheral surface (36) and a driven surface (38) located between the rear face (24) of the front portion (16) and the tooth rear surface (32), wherein:
         the driven surface (38) ramps radially outwardly in both a rearward axial direction along the stem axis (A3) and circumferentially in said direction of rotation.

17. A tool shank (14) having a direction of rotation and comprising a female portion (44) at a front end thereof, the female portion (44) comprising:
   a front face (48); and
   a clamping cavity (50) opening out to the front face (48), the clamping cavity (50) being formed by the union of an access hole (52) and a gripping bore (54), wherein:
   the gripping bore (54) extends along a gripping bore axis (A1) and has a circular cross section with a gripping bore diameter D2, the gripping bore (54) comprising a gripping surface (60) having an arc angle (α) greater than 180 degrees;
   the access hole (52) comprises a tooth access hole (64) merging with an access bore (62);
   the tooth access hole (64) is formed in the front face (48) and extends rearwardly;
   the access bore (62) extends along an access bore axis (A2) and has a circular cross section with an access bore diameter D1;
   D1>D2;
   the gripping bore axis (A1) and the access bore axis (A2) are spaced apart from one another at least along a portion thereof; and
   the clamping cavity (50) has an internal coupling recess (66) formed in the gripping surface (60) of the gripping bore (54), the internal coupling recess (66) comprising a drive surface (68) having a frusto-conical shape.

18. A cutting tool having a direction of rotation, the cutting tool comprising a cutting head (12) and a tool shank (14); wherein:
   the cutting head (12) comprises:
      a front portion (16) at a front end of the cutting head (12), the front portion having a rearwardly facing rear face (24); and
      a male portion (18) extending rearwardly from the front portion (16), the male portion (18) comprising:
         a cylindrical stem (20) having a longitudinal stem axis (A3), a stem diameter D3, and a stem peripheral surface (22); and
         a circumferentially extending coupling tooth (28) projecting from the stem peripheral surface (22), the coupling tooth (28) comprising opposite tooth front and rear surfaces (30, 32), opposite tooth side surfaces (34), a tooth peripheral surface (36) and a driven surface (38) located between the rear face (24) of the front portion (16) and the tooth rear surface (32), wherein:
            the driven surface (38) ramps radially outwardly in both a rearward axial direction along the stem axis (A3) and circumferentially in said direction of rotation;
   the tool shank (14) comprises a female portion (44) at a front end thereof, the female portion (44) comprising:
      a front face (48); and
      a clamping cavity (50) opening out to the front face (48), the clamping cavity (50) being formed by the union of an access hole (52) and a gripping bore (54), wherein:
      the gripping bore (54) extends along a gripping bore axis (A1) and has a circular cross section with a gripping bore diameter D2, the gripping bore (54) comprising a gripping surface (60) having an arc angle (α) greater than 180 degrees;
      the access hole (52) comprises a tooth access hole (64) merging with an access bore (62);
      the tooth access hole (64) is formed in the front face (48) and extends rearwardly;
      the access bore (62) extends along an access bore axis (A2) and has a circular cross section with an access bore diameter D1;

D1>D3>D2;
the gripping bore axis (A1) and the access bore axis (A2) are spaced apart from one another at least along a portion thereof; and
the clamping cavity (50) has an internal coupling recess (66) comprising a drive surface (68) having a frusto-conical shape; and
the cutting head (12) is movable between:
an unclamped position in which the male portion (18) is located in the access hole (52) and is free to slidingly move in an axial direction relative to the female portion (44), the coupling tooth (28) is located in the tooth access hole (64) and the gripping surface (60) of the gripping bore (54) does not abut the stem peripheral surface (22); and
a clamped position in which the drive surface (68) of the internal coupling recess (66) is in driving engagement with the driven surface (38), and the gripping surface (60) of the gripping bore (54) is in engagement with the stem peripheral surface (22).

19. The cutting tool according to claim 18, wherein:
the cylindrical stem (20) has a stem rear surface (26);
the circumferentially extending coupling tooth (28) is axially spaced apart from the stem rear surface (26);
the clamping cavity (50) has a clamping cavity rear surface (56); and
the internal coupling recess (66) is axially spaced apart from the clamping cavity rear surface (56) in a direction of the front face (48).

20. The clamping mechanism according to claim 1, wherein:
the cylindrical stem (20) has a stem rear surface (26);
the circumferentially extending coupling tooth (28) is axially spaced apart from the stem rear surface (26);
the clamping cavity (50) has a clamping cavity rear surface (56); and
the internal coupling recess (66) is axially spaced apart from the clamping cavity rear surface (56) in a direction of the front face (48).

21. The cutting head (12) according to claim 16, wherein:
the cylindrical stem (20) has a stem rear surface (26); and
the circumferentially extending coupling tooth (28) is axially spaced apart from the stem rear surface (26).

22. The tool shank (14) according to claim 17, wherein:
the clamping cavity (50) has a clamping cavity rear surface (56); and
the internal coupling recess (66) is axially spaced apart from the clamping cavity rear surface (56) in a direction of the front face (48).

* * * * *